US008286550B2

(12) United States Patent
Sherrill et al.

(10) Patent No.: US 8,286,550 B2
(45) Date of Patent: Oct. 16, 2012

(54) CUTTING APPARATUS

(76) Inventors: Kurt Sherrill, St. James, MO (US); Stacy Sherrill, St. James, MO (US)

( * ) Notice: Subject to any disclaimer, the term of this patent is extended or adjusted under 35 U.S.C. 154(b) by 438 days.

(21) Appl. No.: 12/712,706

(22) Filed: Feb. 25, 2010

(65) Prior Publication Data

US 2010/0212518 A1 Aug. 26, 2010

Related U.S. Application Data

(60) Provisional application No. 61/155,299, filed on Feb. 25, 2009.

(51) Int. Cl.
*A47J 17/00* (2006.01)

(52) U.S. Cl. ............. 99/537; 30/304; 83/455; 83/468.1; 99/539

(58) Field of Classification Search .................... 99/537, 99/539; 30/273, 287, 292, 294, 299, 300, 30/304, 314; 83/167, 193, 195, 743, 745, 83/746, 751, 753, 761, 762, 775, 776, 780, 83/452, 455, 468.1, 468.4, 613, 821, 827, 83/660

See application file for complete search history.

(56) References Cited

U.S. PATENT DOCUMENTS

| | | | | | |
|---|---|---|---|---|---|
| 2,023,345 | A * | 12/1935 | Storer et al. | ................. | 83/468.1 |
| 3,709,273 | A * | 1/1973 | Jaccard et al. | .................. | 83/751 |
| 4,043,003 | A | 8/1977 | Lemmon | | |
| 5,533,269 | A * | 7/1996 | Pickens et al. | .................. | 30/304 |
| 7,107,890 | B2 * | 9/2006 | Vincent | ........................... | 83/247 |
| 2005/0028685 | A1 * | 2/2005 | Yamamoto | ...................... | 99/537 |

* cited by examiner

*Primary Examiner* — Benjamin Layno
(74) *Attorney, Agent, or Firm* — L. C. Begin & Associates, PLLC.

(57) ABSTRACT

One embodiment of a cutting apparatus for edibles may include a base member. The cutting apparatus may also include a pair of sliding assemblies mounted on opposite edges of a top surface of the base member. The cutting apparatus may further include a cutting assembly slidably carried by the pair of sliding assemblies. The cutting assembly may include a pair of side plates mounted on the pair of sliding assemblies. The cutting assembly may also include a plurality of spacers mounted between the pair of side plates in a spaced apart relation. Further, the cutting assembly may include a plurality of blades held by the plurality of spacers, press-fitted between the pair of side plates. The cutting apparatus may also include a handle assembly mounted between the cutting assembly and the pair of sliding assemblies and adapted for slidably moving the cutting assembly over the base member.

9 Claims, 6 Drawing Sheets

CUTTING APPARATUS

CROSS REFERENCE TO RELATED APPLICATION

This application claims the benefit of U.S. Provisional Application No. 61/155,299 filed on Feb. 25, 2009, herein incorporated by reference.

FIELD OF THE DISCLOSURE

The present disclosure generally relates to cutting apparatus, and, more particularly to a cutting apparatus for edibles, such as fish, meat, vegetables, and fruits.

BACKGROUND OF THE DISCLOSURE

Cutting or sectioning edibles, such as fish, meat, fruits, and vegetables, in equal sizes for consuming the edibles cooked or uncooked may be preferred. Typically, the edibles may be cut or sectioned using a knife. Further, a knife may be used for removing unwanted portions from the edibles.

However, the use of knife for cutting the edibles or removing unwanted portions from the edibles may not be efficient with regard to certain edibles. For example, with regard to fish fillets, thoroughly removing or dissolving bones from the fish fillets using a knife may not be possible and further doing the same may consume substantial time. It is therefore, very desirable to either totally remove the bones from fish fillets prior to cooking or to reduce length of the bones in the fish fillets for allowing the fish fillets to be conveniently cooked and safely consumed.

SUMMARY OF THE DISCLOSURE

One embodiment of a cutting apparatus for edibles may include a base member. The cutting apparatus may also include a pair of sliding assemblies mounted on opposite edges of a top surface of the base member. The cutting apparatus may further include a cutting assembly slidably carried by the pair of sliding assemblies. The cutting assembly may include a pair of side plates, each side plate of the pair of side plates may be mounted on a respective sliding assembly of the pair of sliding assemblies. The cutting assembly may also include a plurality of spacers mounted between the pair of side plates in a spaced apart relation. The cutting assembly may further include a plurality of blades which may be received between the plurality of spacers. The plurality of blades may be held by the plurality of spacers, press-fitted between the pair of side plates. The cutting apparatus may also include a handle assembly mounted between the cutting assembly and the pair of sliding assemblies. The handle assembly may be adapted for slidably moving the cutting assembly over the top surface of the base member. The top surface of the base member may be adapted to support the edibles thereon for allowing the cutting assembly to cut the edibles when the cutting assembly may be moved over the top surface by the handle assembly.

BRIEF DESCRIPTION OF THE DRAWINGS

The advantages and features of the present disclosure will become better understood with reference to the following detailed description and claims taken in conjunction with the accompanying drawing, in which:

Like reference numerals refer to like parts throughout the description of several views of the drawings.

DETAILED DESCRIPTION OF THE DISCLOSURE

The exemplary embodiments described herein detail for illustrative purposes are subject to many variations in structure and design. It should be emphasized, however, that the present disclosure is not limited to a particular cutting apparatus for edibles as shown and described. It is understood that various omissions and substitutions of equivalents are contemplated as circumstances may suggest or render expedient, but these are intended to cover the application or implementation without departing from the spirit or scope of the claims of the present disclosure. Also, it is to be understood that the phraseology and terminology used herein is for the purpose of description and should not be regarded as limiting.

The terms, "first," "second," and the like, herein do not denote any order, elevation or importance, but rather are used to distinguish one element with another. Further, the terms, "a" and "an" herein do not denote a limitation of quantity, but rather denote the presence of at least one of the referenced item.

The present disclosure may provide a cutting apparatus which may be used for cutting or sectioning edibles, such as fish, meat, vegetables, and fruits. Specifically, the cutting apparatus may be capable of cutting or sectioning the edibles in small and equal sizes.

Figure 1:
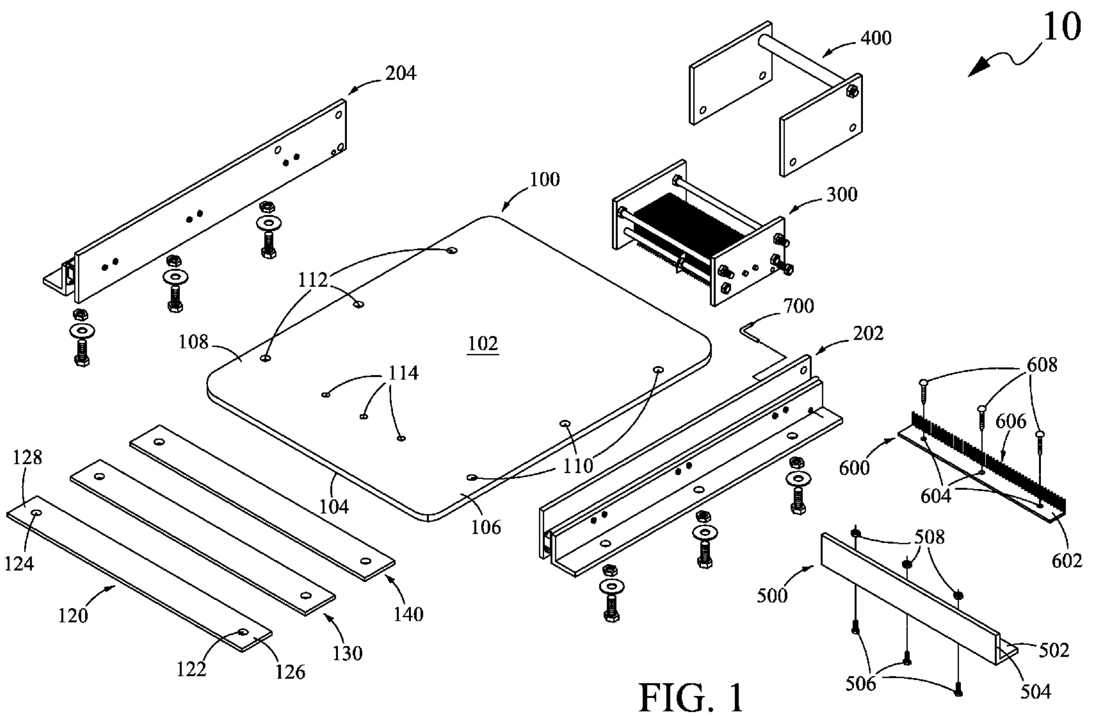
FIG. 1 is a perspective view of one embodiment of a cutting apparatus in an unassembled state.
Figure 2:
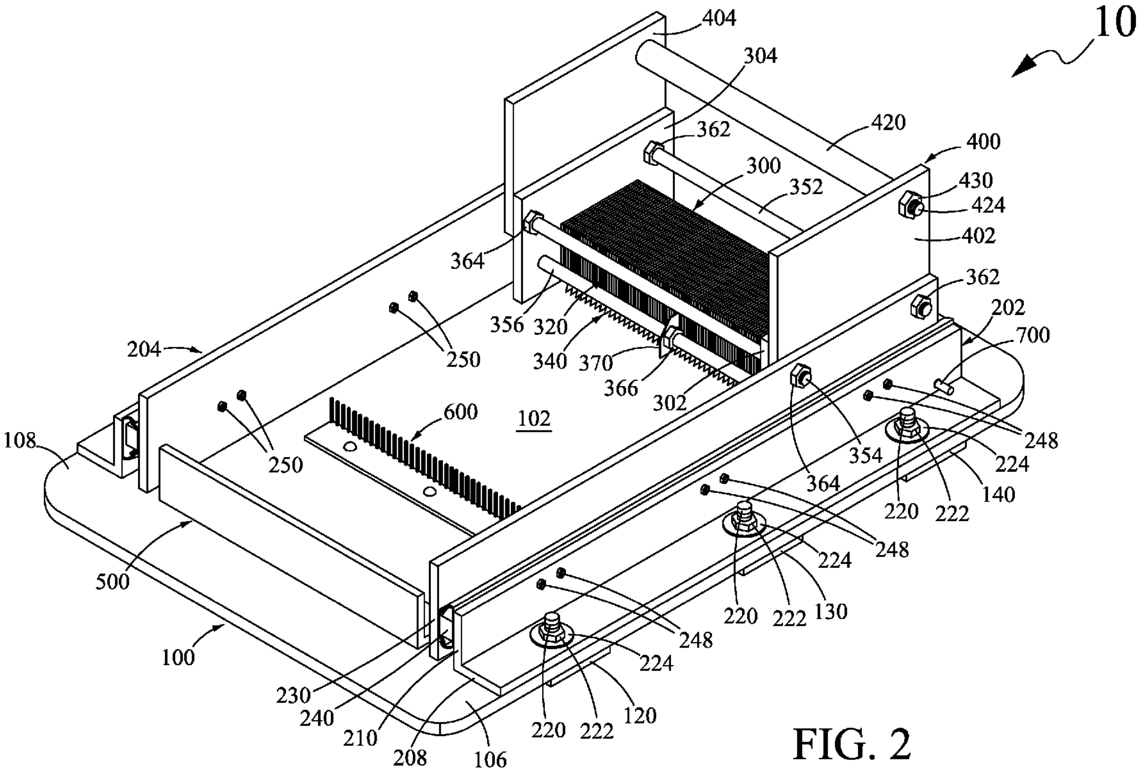
FIG. 2 is a perspective view of the cutting apparatus of FIG. 1 in an assembled state.

Referring to FIGS. 1 and 2, a cutting apparatus 10 may include a base member 100. In the present embodiment, the base member 100 may be rectangular plate like structure. However, the base member 100 may be formed in other useful shapes such as a circular, an oval or any other polygonal plate like structure. The base member 100 may include a top surface 102 and a bottom surface 104, opposite to the top surface 102. The base member 100 may also include a plurality of holes carried by opposite edges 106 and 108 of the base member 100. For example, the edge 106 may include a plurality of holes 110 and the edge 108 may include a plurality of holes 112. Further, the base member 100 may also include a plurality of holes 114 positioned between the opposite edges 106 and 108 of the base member 100.

The cutting apparatus 10 may also include a plurality of plates 120, 130, and 140 adapted to be mounted on the bottom surface 104 of the base member 100, which may be explained herein later. Each plate of the plurality of plates 120, 130, and 140 may include a pair of holes carried by end portions thereof. For example, the plate 120 may include a pan of holes 122 and 124 carried by end portion 126 and 128, respectively, of the plate 120. Similarly, the plates 130 and 140 may also include a pair of holes (not marked) carried by end, portions thereof.

Figure 3:
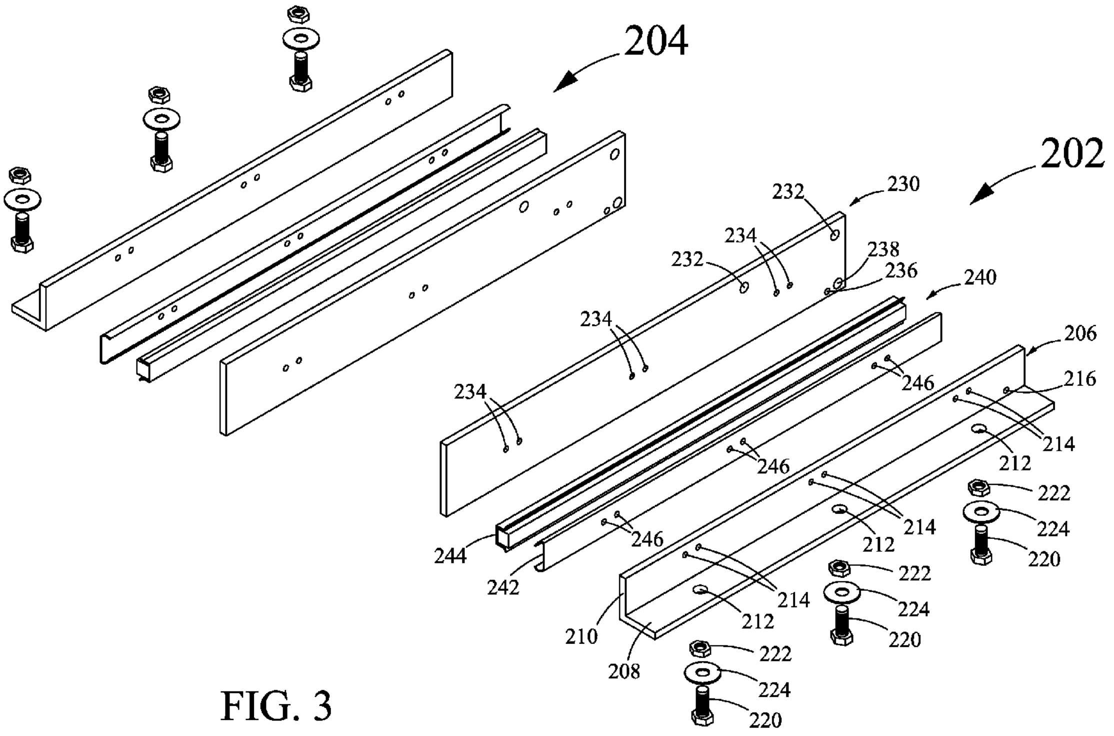
FIG. 3 is a perspective view of a pair of sliding assemblies of the cutting apparatus of FIG. 1 in an unassembled state.

The cutting apparatus 10 may also include a pair of sliding assemblies 202 and 204. The pair of sliding assemblies 202 and 204 may be mounted on the opposite edges 106 and 108, respectively, of the top surface 102 of the base member 100, as shown in FIG. 2. Referring now to FIG. 3, the sliding assembly 202 may include a support plate 206. In the present embodiment, the support plate 206 may have a shape of an L-shaped bracket. Specifically, the support plate 206 may include a horizontal portion 208 and a vertical portion 210 extending from the horizontal portion 208 for configuring the shape of the L-shaped bracket. The horizontal portion 208 may include a set of first holes 212 and the vertical portion 210 may include a set of second holes 214. The support plate 206 may also include a locking hole 216 carried by the horizontal portion 208.

The support plate 206 may be mounted on the edge 106 of the base member 100, as shown in FIG. 2. Specifically, the support plate 206 may be mounted on of base member 100 by a nut bolt arrangement having a plurality of bolts 220, a plurality of nuts 222, and a plurality of washers 224. For mounting, the support plate 206 may be places on the edge 106 of the base member 100, such that the plurality of holes 110 of the base member 100 may align with the set of first holes 212 of the horizontal portion 208 of the support plate 206. Additionally, the plurality of plates 120, 130 and 140 may be also placed on the bottom surface 104 of the base member 100 for allowing the holes, such as the hole 122 (shown in FIG. 1), of the plurality of plates 120, 130, and 140 to align with the plurality of holes 110 of the base member 100. Thereafter, the plurality of bolts 220 may be received through aligned holes of the base member 100, the support plate 206, and the plurality of plates 120, 130 and 140. Further, the plurality of washers 224 may be also received by the plurality of bolts 220, as shown in FIG. 2. Thereafter, the plurality of nuts 222 may be engaged with the plurality of bolts 220, for mounting the support plate 206 on the edge 106 of, the top surface 102 of the base member 100. Moreover, the plurality of plates 120, 130, and 140, particularly end portion, such as the end portion 126, of the plurality of plates 120, 130 and 140 may be also mounted on the bottom surface 104 of the edge 106 of the base member 100.

The sliding assembly 202 may also include a sliding plate 230. In the, present embodiment, the sliding plate 230 may be a rectangular plate having a plurality of holes. Specifically, the sliding plate 230 may include a set of first holes 232 carried by an upper end portion of the sliding plate 230. Further, the sliding plate 230 may also include a set of second holes 234 carried by an intermediate portion of the sliding plate 230. Moreover, the sliding plate 230 may also include a support hole 236 and a locking hole 238 adjacent to the support hole 236, each of the holes formed at a lower end portion of the sliding plate 230.

The sliding assembly 202 may also include a sliding mechanism 240 adapted to slidably engage the support plate 206 and the sliding plate 230. In the present embodiment, the sliding mechanism 240 may be a sliding rail, known in the art. The sliding mechanism 240 may include a fix member 242 and a sliding member 244. The fix member 242 may be capable of slidably receiving the sliding member 244 for allowing the sliding member 244 to slidably move along a length of the fix member 242. Further, the fix member 242 may include a plurality of holes 246 carried by an intermediate portion thereof.

The fix member 242 of the sliding mechanism 240 may be mounted on the support plate 206. Specifically, the fix member 242 may be rested on the vertical portion 210 of the support plate 206 such that the set of second holes 214 of the vertical portion 210 may align with the plurality of holes 246 of the fix member 242. Thereafter, a nut bolt assembly 248 (shown in FIG. 2) may engage the fix member 242 with the vertical portion 210 of the support plate 206.

The sliding member 244 of the sliding mechanism 240 may be mounted on the sliding plate 230. Specifically, the sliding member 244 may be rested on or fixed to the sliding plate 230 such that the set of second holes 234 of the sliding plate 230 may align with a plurality hole (not shown) of the sliding member 244. Thereafter, a nut and bolt assembly, such as a nut and bolt assembly 250 (shown in FIG. 2) may engage the sliding member 244 with the sliding plate 230. Therefore, when the fix member 242 may receive the sliding member 244, the sliding plate 230 may slidably move on the support plate 206.

The structural configuration and the function of the sliding assembly 202 may be substantially similar or equivalent to the sliding assembly 204; accordingly the description of the sliding assembly 204 is avoided for the sake of brevity. However, the sliding assembly 204 may be mounted on the edge 108 of the top surface 102 of the base member 100, as shown in FIG. 2. Additionally, end portions, such as the end portion 128 (shown in FIG. 1), of the plurality of plates 120, 130, and 140 may be mounted on the bottom surface 104 of the base member 100 along with the sliding assembly 204.

Figure 4:
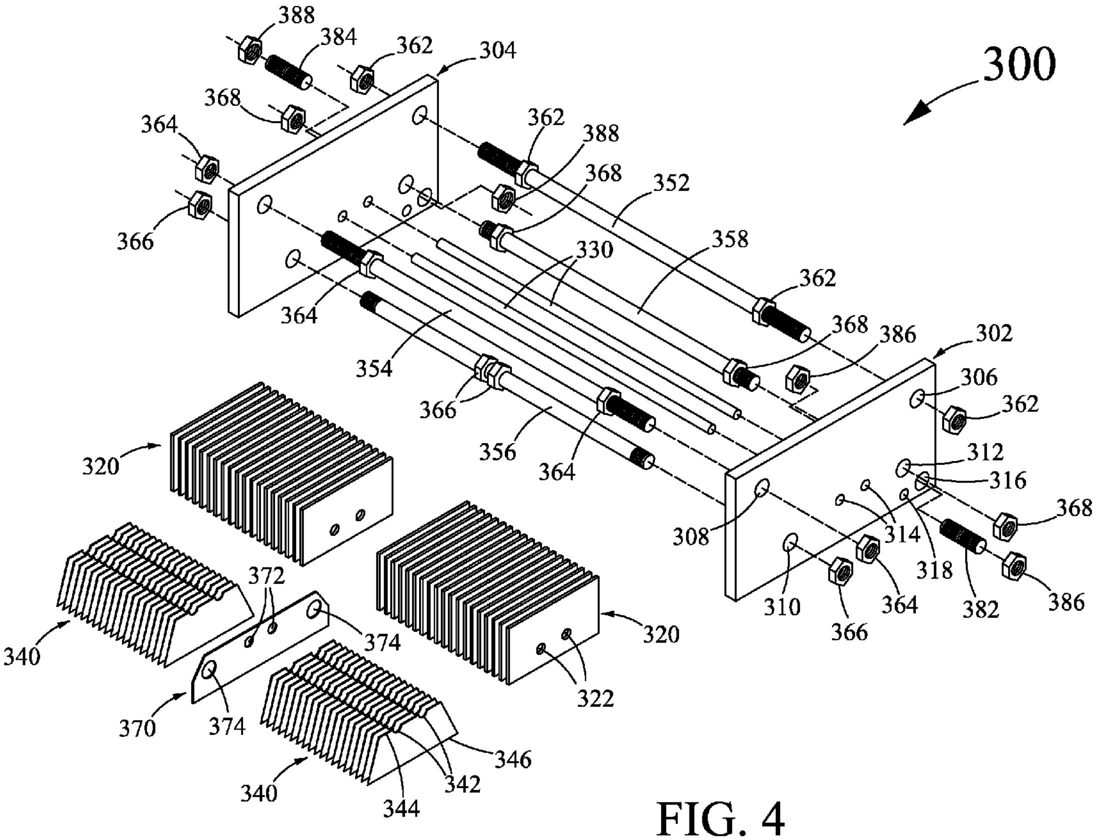
FIG. 4 is a perspective view of a cutting assembly of the cutting apparatus of FIG. 1 in an unassembled state.

The cutting apparatus 10 may also include a cutting assembly 300, (best shown in FIG. 4). The cutting assembly 300 may include a pair of side plates 302 and 304. Each side plate of the pair of side plates 302 and 304 may be a rectangular plate having a plurality of holes. For example, the side plate 302 may include a set of first holes 306, 308, 310 and 312. Further, the side plate 302 may include a pair of second holes 314. Moreover, the side plate may also include a support hole 316 and a locking hole 318. The structural configuration of the side plate 302 may be similar to the side plate 304; accordingly the description of the side plate 304 is avoided for the sake of brevity.

The cutting assembly 300 may also include a plurality of spacers 320. In the present embodiment, each spacer of the plurality of spacers 320 may be rectangular shaped plate. Alternatively, the plurality of spacers 320 may be a circular, an oval or any other polygonal shaped plate. Each spacer of the plurality of spacers 320 may include a pair of holes 322 (as shown in FIG. 4). Further, the plurality of spacers 320 may be mounted between the pair of side plates 302 and 304 in a spaced apart relation (as shown in FIG. 2). Specifically, the cutting assembly 300 may include a pair of first rods 330 which may pass through a pair of holes, such as the pair of holes 322, of each spacer of the plurality of spacers 320. Further, the pair of first rods 330 may be connected to the pair of side plates 302 and 304 for mounting the plurality of spacers 320 between the pair of side plates 302 and 304. Specifically, the pair of first rods 330 may be received by a pair of second holes, such as the pair of second holes 314, of each side plate of the pair of side plates 302 and 304, thereby mounting the plurality of spacers 320 between the pair of side plates 302 and 304, as shown in FIG. 1.

The cutting assembly 300 may also include a plurality of blades 340. In the present embodiment, each blade of the plurality of blades 340 may be trapezium shaped plate. Alternatively, the plurality of blades 340 may be formed in any other useful shape such as a polygonal shaped plate. Further, each blade of the plurality of blades 340 may include a pair of cutout sections 342 carried by a top edge 344 of the each blade of the plurality of blades 340. Moreover, each blade of the plurality of blades 340 may include a bottom edge 346, opposite to the top edge 344, which may be a sharp cutting edge.

The plurality of blades 340 may be held by the plurality of spacers 320. Specifically, the plurality of blades 340 may be received between the plurality of spacers 320, spaced apart from each other. Further, when the plurality of blades 340 may be received between the plurality of spacers 320, a pair of cutout sections, such as the pair of cutout sections 342, of each blade of the plurality of blades 340 may receive the pair of first rods 330 therein. Moreover, the plurality of blades 340 may be held by the plurality of spacers 320, the blades 340 preferably press-fitted or otherwise oriented between the pair of side plates 302 and 304. Specifically, the cutting assembly 300 may include a set of second rods 352, 354, 356 and 358 adapted to extend between the pair of side plates 302 and 304 and to press-fit the plurality of spacers 320 between the pair of side plates 302 and 304.

Each rod of the set of second rods 352, 354, 356 and 358 may include external threads adapted to be threadably engaged with a plurality of nuts for press-fitting the plurality of spacers 320 between the pair of side plates 302 and 304. For example, the second rod 352 may be received through holes, such as the first hole 306, of each side plate of the pair side plates 302 and 304. Thereafter, the second rod 352 may be threadably engaged with a plurality of nuts 362 for press-fitting the pair of side plates 302 and 304 (as shown in FIG. 2). Similarly, the second rod 354 may be received through holes, such as the first hole 308, of each side plate of the pair side plates 302 and 304, and threadably engaged with a plurality of nuts 364. Further, the second rod 356 may be received through holes, such as the first hole 310, of each side plate of the pair side plates 302 and 304, and threadably engaged with a plurality of nuts 366. Moreover, the second rod 358 may be received through holes, such as the first hole 312, of each side plate of the pair side plates 302 and 304, and threadably engaged with a plurality of nuts 368. Accordingly, the plurality of spacers 320 may be press-fitted between the pair of side plates 302 and 304, by the set of second rods 352, 354, 356 and 358, for holding the plurality of blades 340 therebetween.

As shown in FIG. 4, the second rods 356 and 358 may be short in length as compare to the second rods 352 and 354. Therefore, the second rods 356 and 358 may extend between the pair of side plates 302 and 304, however the second rods 352 and 354 may extend out of the pair of side plates 302 and 304, upon press-fitting the plurality of spacers 320 between the pair of side plates 302 and 304 (which may be explained herein later).

In the present embodiment, the cutting assembly 300 may also include a central spacer 370 adapted to be centrally mounted between the plurality of spacers 320 and the plurality of blades 340, as shown in FIG. 2. The central spacer 370 may include a pair of holes 372 adapted to receive the pair of first rods 330 therethrough, when centrally placed between the plurality of spacers 320 and the plurality of blades 340. Further, the central spacer 370 may also include a pair of holes 374 adapted to receive the second rods 356 and 358 therethrough, for allowing the central spacer 370 to be centrally mounted between the plurality of spacers 320 and the plurality of blades 340.

The cutting assembly 300 may be slidably carried by the pair of sliding assemblies 202 and 204. Specifically, the pair of side plates 302 and 304 of the cutting assembly 300 may be mounted on a respective sliding assembly of the pair of sliding assemblies 202 and 204. For example, the side plate 302 may be mounted on the sliding plate 230 of the sliding assembly 202. Specifically, the side plate 302 may be placed adjacent to the sliding plate 230, such that the first holes 306 and 308 of the side plate 302 may align with the set of first holes 232 (shown in FIG. 3) of the sliding plate 230. Thereafter, the second rods 356 and 558 extending out of the base plate 302 may be received through the aligned holes of the sliding plate 230 and the side plate 302 and the plurality of nuts 366 and 368 may be engaged with the second rods 356 and 558 for mounting the side plate 302 on the sliding plate 230, as shown in FIG. 2. Similarly, the side plate 304 of the cutting assembly 300 may be mounted on a sliding plate (not numbered) of the sliding assembly 204.

Further, as shown in FIG. 4, the cutting assembly 300 may also include a pair support rods 382 and 384 (threaded rods) adapted to engage the pair of side plates 302 and 304 of the cutting assembly 300 with the sliding plates, such as the sliding plates 230, of the pair of sliding assemblies 202 and 204. More specifically, the support rod 382 may be received through the support hole 316 of the side plate 302 and the locking hole 238 (shown in FIG. 3) of the sliding plate 230, and thereafter the support rod 382 may be threadably engaged with a pair of nuts 386 for coupling the side plates 302 and the sliding plate 230. Similarly, the support rod 384 may be received through support holes of the side plate 304 and the sliding plate of the sliding assembly 204, and thereafter may threadably engaged with a pair of nuts 388 for coupling the side plates 304 and the sliding plate of the sliding assembly 204.

The sliding plates 230 of the pair of sliding assemblies 202 and 204 may be adapted to slidably move with respect to the support plates, such as the support plate 206, of the pair of sliding assemblies 202 and 204. For example, the sliding plate 230 may be adapted to slidably move with respect to the support plates 206. Accordingly, the cutting assembly 300, engaged with the sliding plates 230, may be adapted to slidably move with respect to the support plates 206. Specifically, the cutting assembly 300 may be adapted for slidably moving over the top surface 102 of the base member 100, facilitated through sliding engagement of the pair of sliding assemblies 202 and 204 with the top surface 102.

Figure 5:
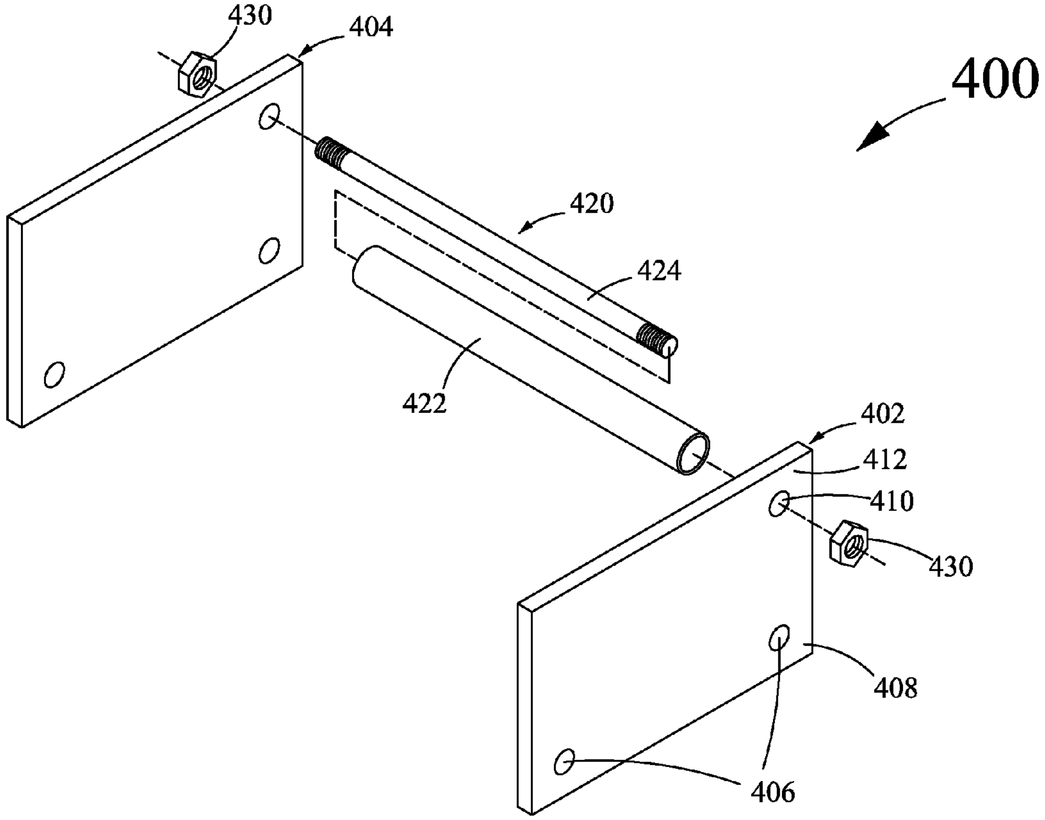
FIG. 5 is a perspective view of a handle assembly of the cutting apparatus of FIG. 1 in an unassembled state.

Referring back to FIG. 1, the cutting apparatus 10 may also include a handle assembly 400 (best shown in FIG. 5). The handle assembly 400 may include a pair of handle plates 402 and 404. The pair of handle plates 402 and 404 may be rectangular plate shaped structure having a plurality of holes configured thereon. For example, the handle plate 402 may include a pair of first holes 406 carried by a lower end portion 408 of the handle plate 402. Further, the handle plate 402 may also include a second hole 410 carried by an upper end portion 412 of the handle plate 402. The structural configuration of the handle plate 402 may be similar to the handle plate 404; according description of the handle plate 404 is avoided for the sake of brevity.

The handle assembly 400 may also include a handle member 420 extending between the pair of handle plates 402 and 404, as shown in FIG. 2. The handle member 420 may include a handle tube 422. As shown in FIG. 5, the handle member 420 may also include a handle rod 424 adapted to be received through the handle tube 422. The handle member 420 may also include nuts 430 adapted for securing the handle rod 424 along with the handle tube 422 between the pair of handle plates 402 and 404 (as shown on FIG. 2). Specifically, the handle rod 424 may be received through the handle tube 422, and thereafter end portions of the handle rod 424 may be received through the holes, such as the second hole 410, of the pair of handle plates 402 and 404. Thereafter, the nuts 430 may be threadably engaged with the end portions of handle rod 424 for supporting the handle rod 424 along with the handle tube 422 between the pair of handle plates 402 and 404.

The handle assembly 400, particularly, the pair of handle plates 402 and 404 may be mounted between the cutting assembly 300 and the pair of sliding assemblies 202 and 204. For example, the handle plate 402 may be mounted between the side plate 302 and the sliding plate 230, as shown in FIG.

2. Specifically, the handle plate 402 may be placed between the side plate 302 and the sliding plate 230, such that the pair of first holes 406 of the handle plate 402 may align with the first holes 306 and 308 (shown in FIG. 4) of the side plate 302 and may further align with the set of first holes 232 (shown in FIG. 3) of the sliding plate 230. Thereafter, the second rods to 352 and 354, extending out of the side plate 302, may be allowed to be received through the aligned holes of handle plate 402, the side plate 302 and the sliding plate 230. Further, the plurality of nuts 362 and 364 may be engaged with the second rods 352 and 354 for allowing the handle plate 402 to be mounted between the side plate 302 and the sliding plate 230 (as shown m FIG. 2). Similarly, the handle plate 404 of the handle assembly 400 may be also mounted between the side plate 304 of cutting assembly 300 and the sliding plate of the sliding assembly 204. Therefore, the handle assembly 400, particularly, the handle member 420 may facilitate slidable movement of the cutting assembly 300 over the top surface 102 of the base member 100. Although the handle assembly 400 has been described in the present invention for moving the blades 340 across the edible, it will be appreciated that other means for moving the blades 340 over the food are contemplated, including other handle configurations, or even motor-driven means for moving the blades.

Referring back to FIG. 1, the cutting apparatus 10 may also include a stopper 500. In the present embodiment, the stopper 500 may have shape of an L-shaped bracket. Specifically, the stopper 500 may include a horizontal portion 502 and a vertical portion 504 extending from the horizontal portion 502 for configuring the shape of the L-shaped bracket. The stopper 500 may be mounted on the top surface 102 of the base member 100 (as shown in FIG. 2). For example, as shown in FIG. 1, the stopper 500 may be mounted by a nut and bolt arrangement, which may include a plurality of bolts 506 and a plurality of nuts 508. Specifically, as shown in FIG. 2, the stopper 500 may be laterally positioned to the opposite edges 106 and 108 of the base member 100. Further, when the stopper 500 may be placed on the top surface 102 of the base member 100, the horizontal portion 502 of the stopper 500 may cover the plurality of holes 114 of the base member 100. It should be understood that the horizontal portion 502 of the stopper 500 may include a plurality of holes (not shown) which may align with the plurality of holes 114 of the base member 100. Therefore, the plurality of bolts 506 may be received through the aligned holes of the stopper 500 and the base member 100 for allowing the plurality of nuts 508 to engage with the plurality of bolts 506 thereby mounting the stopper 500 on the top surface 102 of the base member 100.

The stopper 500 may be adapted to restrict the slidable movement of the cutting assembly 300 at a predetermined position. Specifically, when the cutting assembly 300 may be slidably moved towards the stopper 500, the pair of side plates 302 and 304 may be contact the vertical portion 504 of the stopper 500 thereby restricting the slidable movement of the cutting assembly 300. However, as show in. FIG. 2, the stopper 500 may be positioned away from the pair of sliding assemblies 202 and 204, for allowing the sliding plates, such as the sliding plate 230, of the pair of sliding assemblies 202 and 204 to slidably move over the top surface 102 of the base member 100.

Referring back to FIG. 1, the cutting apparatus 10 may also include a comb 600. The comb 600 may include a base portion 602 having a plurality of holes 604. The comb 600 may also include a plurality of pins 606 extending from the base portion 602 in a spaced apart relation. The comb 600 may be mounted on the top surface 102 of the base member 100, as shown in FIG. 2. Specifically, the comb 600 may be mounted on the base member 100 by a plurality of screws 608, which may be received by the plurality of holes 604 of the base portion 602 and inserted into the base member 100. Further, as shown in FIG. 2, the comb 600 may be laterally positioned to the opposite edges 106 and 108 of the base member 100 and may be positioned adjacent to the stopper 500.

The comb 600 may be adapted to hold edibles on the top surface 102 of the base member 100 for allowing the cutting assembly 300 to cut the edibles. Specifically, the edible may be inserted with the plurality of pins 606 of the comb 600 for allowing the edibles to be secured on the top surface 102 of the base member 100. Alternatively, although not shown, the edible may be placed between the comb 600 and the plurality of blades 340 in an unsecured fashion. Thereafter, when the cutting assembly 300 is slidably moved over the top surface 102, the edible may be cut by the plurality of blades 340 of the cutting assembly 300. Further, as explained herein, the plurality of pins 606 may extend from the base portion 602 in the spaced apart relation. Therefore, when the edible is secured by the comb 600, the plurality of blades 340 of the cutting assembly 300 may pass through, between the plurality of pins 606 of the comb 600 thereby cutting the edible as the cutting assembly 300 is slidably moved over the top surface 102 of the base member 100.

Referring back to FIG. 1, the cutting apparatus 10 may also include a locking pin 700 which may be adapted to selectively lock and unlock the slidable movement of the cutting assembly 300. In the present embodiment, the locking pin 700 may be an L-shaped rod which may be adapted to lock the cutting assembly 300 with the sliding assembly 202. Specifically, the locking pin 700 may be received through the locking holes 318 and 236 of the side plate 302 and the sliding plate 230, respectively, and thereafter may be received through the locking hole 216 of the support plate 206, as shown in FIG. 2. Therefore, the sliding plate 206 may be locked with the support plate 206 for restricting the slidable movement of the cutting assembly 300 over the base member 100.

Figure 6:
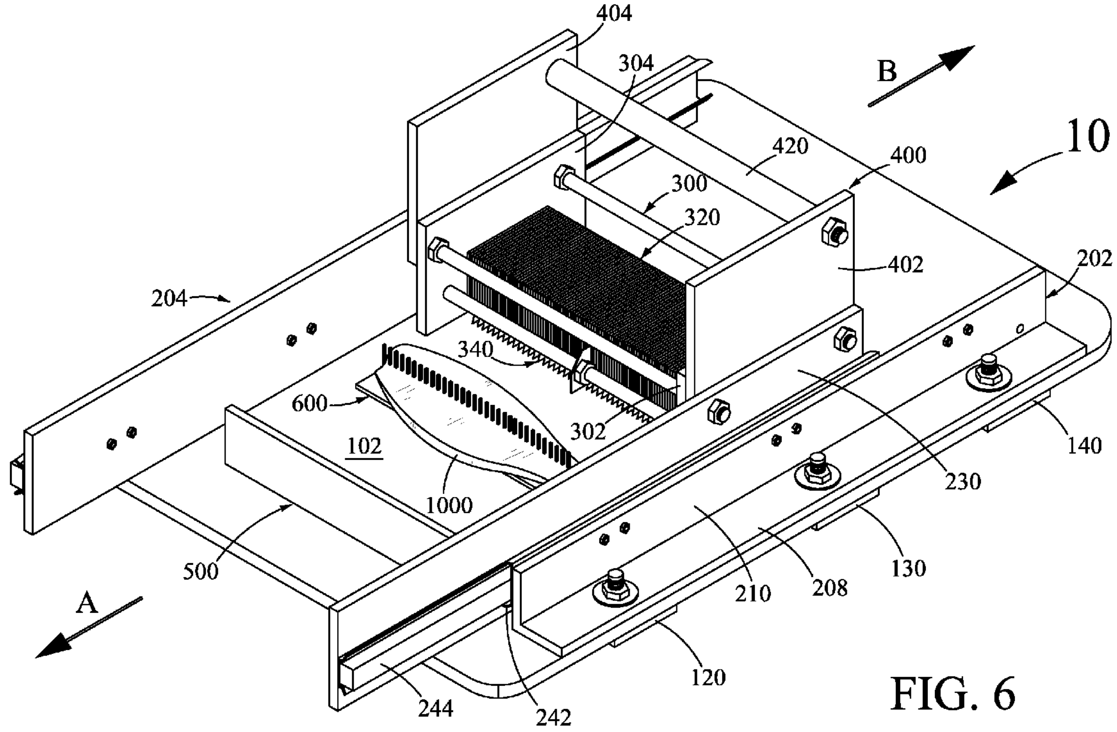
FIG. 6 is an environment in which the cutting apparatus of FIG. 2 may be utilized for cutting edibles.

Referring now to FIG. 6, in use an edible 1000, such as a fish fillet, may be placed on the top surface 102 of the base member 100. Specifically, the edible 1000 may be supported by the comb 600 on the top surface 102 of the base member 100. Thereafter, the cutting assembly 300 may be allowed to slidably move over the top surface 102 of the base member 100 in a forward direction shown with arrow 'A'. Specifically, an individual may use the handle member 420 of the handle assembly 400 for slidably moving the cutting assembly 300 in the forward direction. Therefore, when the plurality of blades 340 of the cutting assembly 300 may pass through, between the plurality of pins 606 of the comb 600, the edible 1000 may be cut by the plurality of blades 340 of the cutting assembly 300.

In the present embodiment, when the edible 1000 may be the fish fillet, the plurality of blades 340 of the cutting assembly 300 may cut the bones in the fish fillet to lengths such that the fish fillet may be conveniently cooked and may be safely consumed. Alternatively, the cutting apparatus 10 may be used for cutting edibles, such as potato for making potato slices, and may be used for cutting boneless meat, and the like. Further, when edible 1000 may be cut by the cutting assembly 300, the cutting assembly 300 may be slidably moved in a backward direction shown with arrow 'B', for allowing the cutting apparatus 10 to be re used for cutting other edibles.

Based on the foregoing description of the present disclosure, a cutting apparatus such as the cutting apparatus 10, may be capable of cutting or sectioning edibles in equal sizes. The cutting apparatus results in time savings, generally invested for cutting edibles in equal sizes. Further, the cutting apparatus may also save time generally invested for removing bones from fish fillets, for safely consuming the fish fillets. The cutting apparatus of the present disclosure may be portable and may be easily stored in a small space after the use thereof.

The foregoing descriptions of specific embodiments of the present disclosure have been presented for purposes of illustration and description. They are not intended to be exhaustive or to limit the present disclosure to the precise forms disclosed, and obviously many modifications and variations are possible in light of the above teaching. The embodiments were chosen and described in order to best explain the principles of the present disclosure and its practical application, to thereby enable others skilled in the art to best utilize the present disclosure and various embodiments with various modifications as are suited to the particular use contemplated. It is understood that various omission and substitutions of equivalents are contemplated as circumstance may suggest or render expedient, but such are intended to cover the application or implementation without departing from the spirit or scope of the claims of the present disclosure.

What is claimed is:

1. A cutting apparatus for edibles, the cutting apparatus comprising:

a base member;

a pair of sliding assemblies mounted on opposite edges of a top surface of the base member;

a cutting assembly slidably carried by the pair of sliding assemblies, the cutting assembly comprising pair of side plates, each side plate of the pair of side plates mounted on a respective sliding assembly of the pair of sliding assemblies, a plurality of spacers mounted between the pair of side plates in a spaced apart relation, and a plurality of blades received between the plurality of spacers, the plurality of blades held by the plurality of spacers press-fitted between the pair of side plates;

wherein the top surface of the base member is adapted to support the edibles thereon for allowing the cutting assembly to cut the edibles as the cutting assembly slidably engages the top surface of the base member.

2. The cutting apparatus of claim 1 further comprising:

a handle assembly mounted between the cutting assembly and the pair of sliding assemblies, the handle assembly adapted for slidably moving the cutting assembly over the top surface of the base member;

wherein the top surface of the base member is adapted to support the edibles thereon for allowing the cutting assembly to cut the edibles as the cutting assembly is moved over the top surface by the handle assembly.

3. The cutting apparatus of claim 1, wherein each sliding assembly of the pair of sliding assemblies comprises:

a support plate mounted on an edge of the opposite edges of the top surface of the base member, a sliding plate mounted on a side plate of the pair of side plates of the cutting assembly, and a sliding mechanism slidably engaging the support plate and the sliding plate, wherein the sliding mechanism adapted for allowing the sliding plate to slide on the support plate thereby allowing the cutting assembly to slidably move over the top surface of the base member.

4. The cutting apparatus of claim 3, wherein the sliding mechanism comprises sliding rails.

5. The cutting apparatus of claim 1, wherein the cutting assembly further comprises:

a pair of first rods passing through the plurality of spacers and connected to the pair of side plates for mounting the plurality of spacers between the pair of side plates, and a set of second rods extending between the pair of side plates, the set of second rods adapted to press-fit the plurality of spacers between the pair of side plates for holding the plurality, of blades between the plurality of spacers.

6. The cutting apparatus of claim 2, wherein the handle assembly comprises:

a pair of handle plates, each handle plate of the pair of handle plates mounted between the cutting assembly and a sliding assembly of the pair of sliding assemblies by a pair of second rods extending between the pair of side plates, and a handle member extending between the pair of handle plates, the handle member adapted for slidably moving the cutting assembly.

7. The cutting apparatus of claim 1, further comprising a stopper mounted on the top surface of the base member and laterally positioned to the opposite edges of the base member, wherein the stopper is adapted to restrict the slidable movement of the cutting assembly at a predetermined position.

8. The cutting apparatus of claim 7, further comprising a comb mounted on the top surface the base member and laterally positioned to the opposite edges of the base member, wherein the comb is positioned adjacent to the stopper and adapted to hold the edibles on the top surface for allowing the cutting assembly to cut the edibles.

9. The cutting apparatus of claim 1, further comprising a locking pin adapted to selectively lock and unlock the slidable movement of the cutting assembly over the top surface of the base member.

* * * * *